United States Patent [19]

Stanton et al.

[11] Patent Number: 5,795,596
[45] Date of Patent: Aug. 18, 1998

[54] COMPRESSION MOLD WITH RUBBER SHIMS

[75] Inventors: Lawrence E. Stanton, Stoughton; Phillip Landry, New Bedford, both of Mass.

[73] Assignee: Acushnet Company, Fairhaven, Mass.

[21] Appl. No.: 598,173

[22] Filed: Feb. 7, 1996

[51] Int. Cl.⁶ .................................................. B29C 43/000
[52] U.S. Cl. ........................ 425/116; 425/408; 425/395
[58] Field of Search ............................ 425/408, 450.1, 425/394, 395, 406, 116, 806; 100/285 A, 295

[56] References Cited

U.S. PATENT DOCUMENTS

| | | | |
|---|---|---|---|
| 4,014,970 | 3/1977 | Jahnle | 264/161 |
| 4,238,179 | 12/1980 | Llabres et al. | 425/394 |
| 4,501,715 | 2/1985 | Barfield et al. | 425/408 |
| 4,508,309 | 4/1985 | Brown | 249/81 |
| 4,558,499 | 12/1985 | Brown | 29/157.3 |
| 4,869,603 | 9/1989 | Melzer et al. | 384/255 |
| 5,059,105 | 10/1991 | Baird | 100/258 A |
| 5,118,271 | 6/1992 | Baird et al. | 425/116 |
| 5,191,923 | 3/1993 | Goss | 425/425 |
| 5,213,000 | 5/1993 | Saya et al. | 74/425 |
| 5,259,752 | 11/1993 | Scolamiero et al. | 100/258 A |
| 5,543,159 | 8/1996 | Iltgen | 425/543 |

FOREIGN PATENT DOCUMENTS

| | | | |
|---|---|---|---|
| 6-64054 | 3/1994 | Japan | B29C 67/14 |
| 831158 | 4/1960 | United Kingdom | 425/408 |
| 2141372 | 12/1984 | United Kingdom | 425/408 |

Primary Examiner—Jay H. Woo
Assistant Examiner—Robert Hopkins
Attorney, Agent, or Firm—Pennie & Edmonds LLP

[57] ABSTRACT

A compression mold having first and second steel plates. First and second frame members are attached to the first and second plates respectively and have a plurality of cavities for receiving replaceable half-molds. The mold further includes a plurality of first and second half-molds positioned within the cavities of the first and second frame members and having opposing top edges for contacting when the mold is closed. First and second rubber shims are positioned between the first and second plates and the first and second half-molds and have a first configuration before curing and a second configuration after curing in that position for positioning the corresponding, opposing half-molds such that their top edges contact each other fully when the mold is closed.

20 Claims, 2 Drawing Sheets

COMPRESSION MOLD WITH RUBBER SHIMS

TECHNICAL FIELD

This invention relates to a compression molding press having mold frames and half-molds positioned with rubber shims. Still further, the invention relates to the curing of the rubber shims in a compression mold to properly align the half-molds.

BACKGROUND OF THE INVENTION

The present invention relates to golf ball compression molds such as those described in U.S. Pat. Nos. 4,508,309 and 4,558,499, which issued to Brown and are assigned to the Acushnet Company and co-pending application No. 08/455,442 which is assigned to the Acushnet Company. The prior art compression molding presses use mold frames secured to steel plates. Within each mold frame is disposed a plurality of cavities. Each cavity accommodates a golf ball half-mold. The golf ball half-molds are disposed in a closely packed arrangement within each frame. Each golf ball half-mold is substantially located horizontally by the cavities in the frames.

In the prior art molds, the mold frames were attached to steel plates to secure and locate them in the compression mold. The golf ball half-molds are located in the frame cavities and would abut against the steel plates. Thus, the steel plates of the prior art molds located the half-molds in the vertical direction. The steel plates, which are located on thermal insulators and press platens, tend to have irregularities and variations such as low and high spots which cause "out-of-flatness" conditions. The steel plates, thermal insulators, and platens will be referred to collectively hereafter as the press assembly. While the out-of-flatness may be minimal, the undulations in the press assembly can cause the half-molds to be located at different vertical positions and mate improperly with the opposing or corresponding half-mold. When the mold is compressed to form a golf ball, the different vertical positions of the half-molds can create unwanted size variations of the golf balls. Out-of-flatness can also cause the half-molds to be misaligned during compression of the press. For example, the out-of-flatness condition causes corresponding half-molds that are on "high" spots to meet first when the mold is closed and can leave gaps between half-molds that are located on "low" spots. These gaps allow excess molding material to escape the mold and form around the golf ball, which hinders the golf ball from properly releasing from the mold frame after formation. In order to get the golf ball to release from the frame, excessive force must be used to push the ball from the mold. This can cause a marking of the ball and injury to the operator. In addition, the excess molding material surrounding the ball can result in undesired size variations between golf balls.

An object of this invention is to reduce the out-of-flatness condition associated with the current compression molding process caused by the irregularities of the press assembly. This, in turn, will improve the release of the golf ball from the mold and improve the size stability and uniformity of the molded golf balls.

SUMMARY OF THE INVENTION

According to the present invention, the foregoing and other objects and advantages are attained by incorporating a rubber shim in conjunction with the previously described components of a compression molding press. The invention is directed to the use of a rubber shim positioned between the steel plate and the molding frame and half-mold components in a compression mold, such that opposing or corresponding half-molds properly align and contact one another.

Preferably, the rubber shims are cured while the mold is in a compressed state so that the upper and lower half-molds seat firmly against one another and there is a small gap between the upper and lower mold frames so that excess cover material can be properly pressed from between the half-molds. More particularly, the rubber shims under each of the half-molds are deformed such that the top edges of the half-molds properly contact the opposing half-molds and the top edges of all of the half-molds are located substantially in a single plane. In this manner, the problems associated with the irregularities of the underlying press assembly are minimized. The result is to reduce problems caused by the out-of-flatness of the press assembly for the half-molds and to increase the consistency in the cover layer of the compression molded golf balls.

In a preferred embodiment of the invention, the compression mold includes a lower platen and an upper platen. The molding process occurs between the two opposing platens. Upper and lower mold insulation layers are attached to the upper and lower platens, respectively. Steel plates are attached to the insulation. A rubber shim is then placed against each steel plate. The mold frames, with the corresponding half-molds therein, are attached to the steel plates with the rubber shims interposed in a first configuration between the frames with the half-molds and the steel plates.

To set the rubber shims and locate the half-molds, the press is compressed via a hydraulic ram or similar device to properly align the half-molds. The rubber shim is cured while the press is in the compressed state to set the shims in a second configuration so that the half-molds are properly positioned to contact one another. The cured shims remove the effects of the irregularities of the underlying press assembly such that the top edges of the corresponding half-molds contact and the contacting top edges of the half-molds are substantially in a single plane when the mold is closed to mold golf balls.

The present invention is also directed to a method of properly aligning half-molds in a compression mold by curing thermosetting rubber shims between the half-molds and steel plates. The method includes locating an elastomer based material between the half-molds and steel plates in a compression mold, compressing the press to a closed position such that the half-molds are compressed against opposing half-molds at low pressure (100 to 200 psi) to self align the half-molds and heating the press for approximately five minutes at a temperature ranging from about 285° F. to 325° F. with the preferred temperature being 320° F. After heating, the press is preferably pressurized for about twenty minutes to a pressure ranging from about 500 psi to 2000 psi with the preferred pressure being approximately 900 psi.

After this step is completed, the corresponding half-molds are properly aligned vertically such that their top edges properly contact each other and are substantially planar. The shims serve to reduce the out-of-flatness condition in an inexpensive and quick fashion. As a result, the molded golf balls may be more readily removed from the molds without the use of excessive force. Additionally, the golf ball size is stabilized and more uniform since the excess molding material does not attach to the molded golf ball by forming gaps between opposing half-molds.

DETAILED DESCRIPTION OF THE PREFERRED EMBODIMENT

Figure 1:
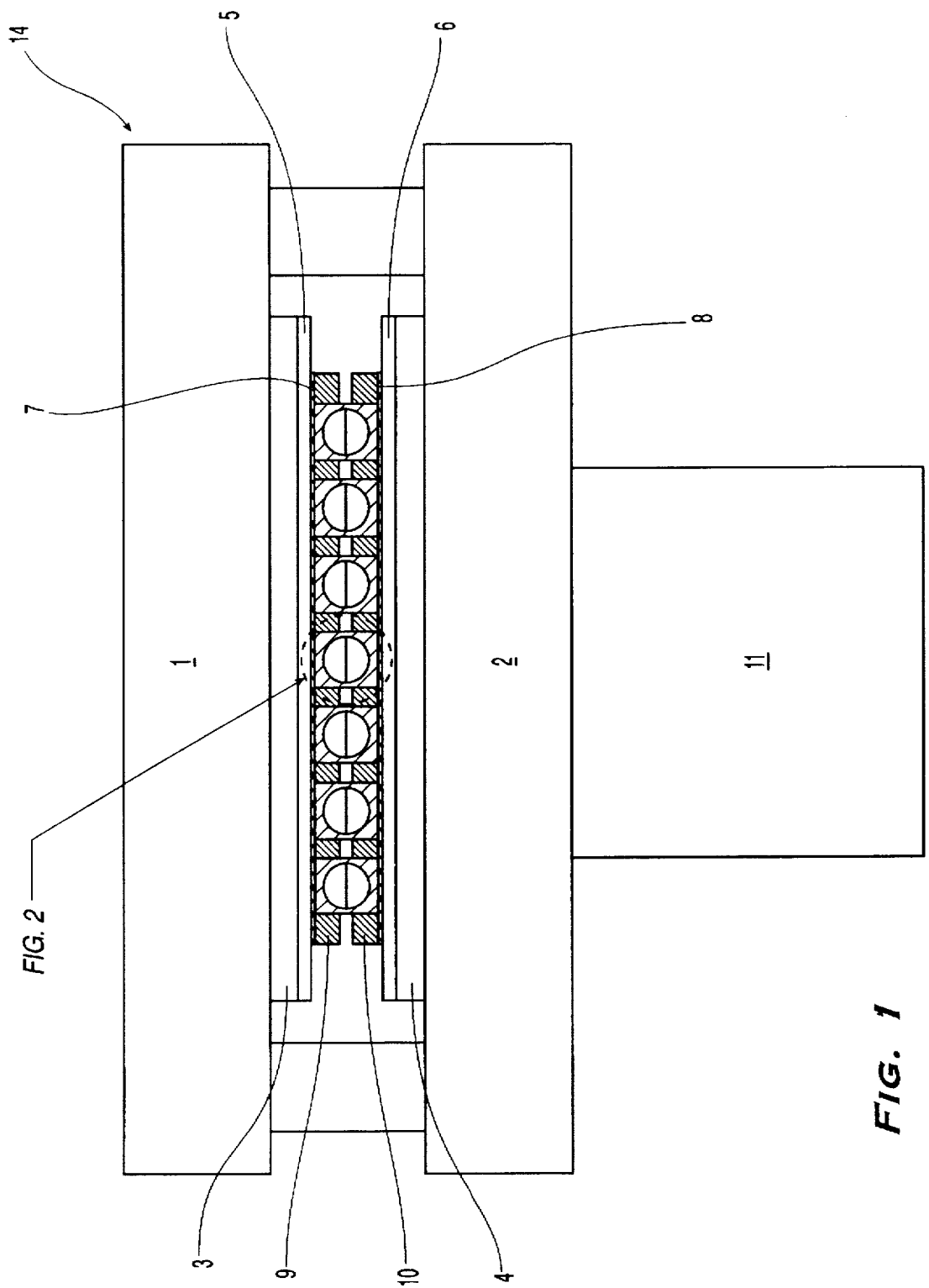
FIG. 1 is a partial cross-sectional view of a compression mold in a compressed position.

FIG. 1 discloses an embodiment of a compression mold 14. The mold is broken into an upper half and a lower half, both primarily having the same features. An upper platen 1 and a lower platen 2 form the basis for the mold 14. Molding insulation 3, 4 is seated on the platens 1, 2. A steel plate 5, 6 is seated on each molding insulation 3, 4. A rubber shim 7, 8 is then seated on each steel plate 5, 6. A half-mold assembly 9, 10, which is comprised of a mold frame 16, 17 having cavities filled with golf ball half-molds 12, 13, is seated on each rubber shim 7, 8. When the press is in a closed position 14, the opposing upper and lower half-molds 12, 13 contact each other to form a molded object such as a golf ball.

Figure 2:
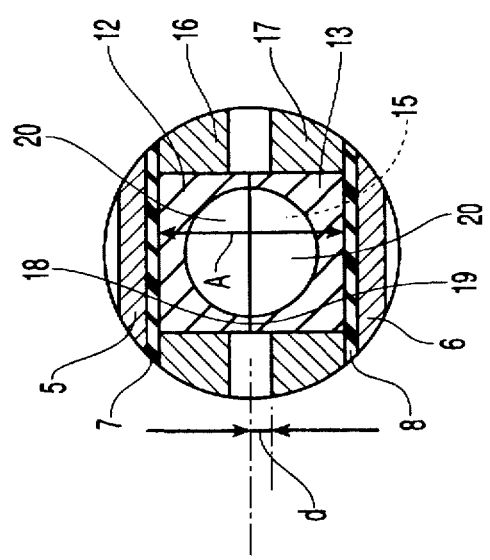
FIG. 2 is an exploded cross-sectional view of the compression mold.

FIG. 2 shows an embodiment of the mold in greater detail. The object 15 is formed by the compression of the opposing upper and lower half-molds under heat and pressure (FIG. 1). The half-mold assemblies 9, 10 are comprised of frames 16, 17 and a plurality of opposing or corresponding upper and lower golf ball half-molds 12, 13. Each frame 16, 17 has a plurality of cavities for disposing the individual golf ball half-molds 12, 13 therein. The golf ball half-molds 12, 13 are primarily positioned in the horizontal plane by the frame 16, 17. The half-molds 12, 13, however, "float" in the cavities of the frames 16, 17 in the vertical direction, as shown by arrow A. Each half-mold 12, 13 has a top edge 18, 19 and an inner molding surface 20. The object is formed between the corresponding molding surfaces 20 of the half-molds 12, 13 while the top edges 18, 19 cut off or remove the excess molding material.

In the present invention, a thermoset rubber shim 7, 8 is positioned in a first configuration between the steel plates 5, 6 and the half-mold assemblies 9, 10. When the rubber shims 7, 8 are cured in a second configuration, they serve to fixedly position each individual golf ball half-mold 12, 13 vertically so that each pair of golf ball half-molds 12, 13 is aligned properly to contact each other when the mold is compressed 14. Proper alignment is such that the opposing or corresponding top edges 18, 19 of the half-molds 12, 13 are substantially planar when the mold is closed. When the properly aligned half-molds 12, 13 are compressed, the top edges 18, 19 of the corresponding upper and lower half-molds 12, 13 contact each other. This contact cuts off or removes any excess molding material from the golf ball being molded. Further, the opposing top edges 18, 19 should be above the mold frame 16, 17 a distance d, such that when the mold is compressed, the opposing top edges 18, 19 contact each other and the excess material from the molded object 15 is pressed away from the molded object 15. This helps prevent excess molding material from collecting around the outer edge of the object 15. It also helps insure that each object 15 will be of substantially the same size. If the opposing mold frames 16, 17 contact each other or close during the molding process, excess material cannot be pressed from between the half-molds 12, 13 and the opposing top edges 18, 19 cannot contact each other.

In the preferred embodiment of this invention, the rubber shim 7, 8 is comprised of an elastomer, a cross-linking agent, an accelerator, an accelerator activator, a processing aid, and a reinforcing filler. The elastomer is preferably comprised of butadiene, nitrile butadiene, or styrene butadiene. The cross-linking agent is preferably sulfur in the amount of about 0.5 to 2 parts per hundred of elastomer. The accelerator is preferably comprised of thiazoles, sulfenamides, or dithiocarbamates in the amount of about 0.5 to 2 parts per hundred of elastomer. The accelerator activator is preferably comprised of caprylic acid, fatty acid, stearic acid, zinc oxide or zinc stearate in the amount of about 0.5 to 5 parts per hundred of elastomer. The processing aid is preferably sunthene oil or calcium stearate in the amount of about 5 to 20 parts per hundred of elastomer. The reinforcing filler is preferably carbon black in the amount of about 20 to 80 parts per hundred of elastomer. Most preferably, the rubber shims 7, 8 are comprised of a commercially available material sold by Goodyear and known under the trademark HYCAR, which is a cross-linkable, rubber based polymer.

In the preferred embodiment of this invention, the rubber shim 7, 8 is made such that the top edges 18, 19 of the half-molds 12, 13 are properly located vertically to contact each other when the mold 14 is compressed. More particularly, the top edges 18, 19 are preferably aligned to contact the opposing top edges 18, 19 and all of the molding surfaces are planar when the mold 14 is closed. Moreover, the top edges 18, 19 should be above the frame 16, 17 by a distance d of approximately 0.02 inches such that excess material from the molded object can escape from between the half-molds 12, 13 and the top edges 18, 19 can contact each other when the mold 14 is compressed. As stated above, it is undesirable for excess mold material to prevent the opposing molding surfaces 18, 19 from contacting. In the preferred embodiment, the shims are less than 0.037 inches thick when placed in the mold 14. More particularly, the shims are approximately 0.033 inches thick. If the shims are too thick, the half-molds 12, 13 can be compressed into the shims when setting the shims such that the top edges 18, 19 are not located above the frames 16, 17.

In the preferred embodiment of this invention, the rubber shims 7, 8 are cured when the press 14 is in the closed, compressed position by first heating the press and then pressurizing the press. The compressed press is first heated for about five minutes at a temperature of about 280° F. to 325° F. with the preferred temperature being 320° F. at a low pressure of about 100 to 200 psi. After heating, the press 14 is compressed further to pressures ranging from about 500 psi to 2000 psi for about twenty minutes. The preferred pressure is 900 psi. The heating process causes the shim 7, 8 to soften and the pressurizing process causes the shim material to flow into any low spots on the steel plate 5, 6. Once the shim 7, 8 has cured, the golf ball half-molds are fixedly positioned in the press assembly such that their top surfaces or the top edges 18, 19 properly contact the opposing top edges and are in flat, planar alignment with each other. As a result, the molded objects produced by the press do not exhibit the shortcomings associated with the out-of-flatness problem found in the prior art.

We claim:

1. A compression mold comprising:

an upper plate and a lower plate having opposing inner rigid surfaces;

upper and lower frame members attached to said upper and lower plates respectively, having a plurality of cavities for receiving half-molds;

a plurality of pairs of corresponding upper half-molds and lower half-molds positioned in the cavities of the upper and lower frame members, each half-mold having a top edge for contacting the top edge of the corresponding half-mold; and a shim comprised of a cured material positioned between the inner surface of at least one of the upper and lower plates and at least one of the upper and lower half-molds, the shim being placed in the mold in a first configuration and deformed to and cured in the mold in a second configuration such that the top edges of the corresponding upper and lower half-molds are positioned to align and fully contact each other substantially upon first contact therebetween when the mold is closed.

2. The compression mold of claim 1 further comprising a hydraulic ram for compressing said upper half-molds and said lower half-molds.

3. The compression mold of claim 1, wherein said shim is comprised of a curable material and a curing agent.

4. The compression mold of claim 3, wherein the cured material is an elastomer comprised of monomers selected from the group consisting of butadiene, nitrile butadiene, and styrene butadiene.

5. A compression mold comprising:

first and second plates;

a plurality of pairs of opposing half-molds, a first half-mold of each pair being disposed adjacent the first plate and having a first opposed surface, a second half-mold of each pair being disposed adjacent the second plate and having a second opposed surface disposed opposite said first opposed surface; and at least one shim located in a position between at least one of said plates and at least one of said half-molds, said shim having a cured configuration that locates and maintains the opposed surfaces of the first and second half-molds in each pair in alignment to fully contact each other substantially upon first contact of the opposed surfaces when the mold is closed.

6. The compression mold of claim 5, wherein the shim is less than 0.037 inches in thickness.

7. The compression mold of claim 5, wherein the shim is about 0.033 inches in thickness.

8. The compression mold of claim 1, wherein the shim is comprised of a thermoset rubber.

9. A compression mold comprising:

first and second plates having opposing inner surfaces;

first and second frame members attached to said first and second plates respectively, having a plurality of cavities therein for receiving half-molds;

a plurality of pairs of opposing half-molds movably disposed in the cavities of the frame members for movement substantially perpendicular to said inner surfaces, a first half-mold of each pair being disposed in the first frame member and having a first opposed surface, a second half-mold of each pair being disposed in the second frame member and having a second opposed surface disposed opposite said first opposed surface; and at least one shim located in a position between at least one of said inner surfaces and at least one of said half-molds, said shim having a first configuration before curing and a second different configuration after curing in said position, said shim when in said second configuration is configured and dimentioned for locating the opposed surfaces of the half-molds in each pair for fully contacting each other substantially upon first contact of the opposed surfaces when the mold is closed.

10. The mold of claim 9, wherein each pair of opposing half molds defines a substantially spherical inner molding surface when the mold is closed.

11. The mold of claim 10, wherein the molding surface is configured for molding a golf ball.

12. The mold of claim 9, wherein the curable material is an elastomer comprised of monomers selected from the group consisting of butadiene, nitrile butadiene, and styrene butadiene.

13. The mold of claim 9, wherein the frame member cavities prevent movement of the half-molds substantially parallel to said plates.

14. The mold of claim 9, wherein said opposed surfaces of the half-molds disposed in each frame are aligned in a single plane when the mold is closed.

15. The mold of claim 9, wherein a space is defined between said first and second frame members when the mold is closed for permitting excess molded material to collect therein when the mold is closed.

16. A compression mold comprising:

first and second plates having opposing inner surfaces;

first and second frame members attached to said first and second plates respectively, having a plurality of cavities for receiving half-molds;

a plurality of pairs of opposing half-molds movably disposed in the cavities of the frame members for movement substantially perpendicular to said inner surfaces, a first half-mold of each pair being disposed in the first frame member and having a first opposed surface, a second half-mold of each pair being disposed in the second frame member and having a second opposed surface disposed opposite said first opposed surface; and at least one cured-in-situ shim disposed between at least one of said inner surfaces and at least one of said half-molds, said shim having a varying thickness whereby said opposed surfaces of the half-molds in each pair are in full contact with each other when the mold is closed.

17. The mold of claim 16, wherein a single shim is disposed against said at least one of said inner surfaces in alignment with all of said cavities.

18. The mold of claim 17, wherein a single shim is disposed against each of said inner surfaces.

19. The mold of claim 9, wherein the shim in the second configuration is configured and dimensioned for reducing irregularities of the plates and the half-molds.

20. The mold of claim 9, wherein the half-molds are independently movably disposed within the cavities of the frame members.

* * * * *